United States Patent
Yeh et al.

(10) Patent No.: US 8,941,626 B1
(45) Date of Patent: Jan. 27, 2015

(54) METHOD FOR COMPENSATING ELECTROMAGNETIC INDUCTIVE PRESSURE LEVEL

(71) Applicant: Waltop International Corporation, Hsinchu (TW)

(72) Inventors: Chia-Jui Yeh, Taipei (TW); Yu-Kuan Chang, Hsinchu (TW)

(73) Assignee: Waltop International Corporation, Hsinchu (TW)

(*) Notice: Subject to any disclaimer, the term of this patent is extended or adjusted under 35 U.S.C. 154(b) by 0 days.

(21) Appl. No.: 14/043,930

(22) Filed: Oct. 2, 2013

(30) Foreign Application Priority Data

Jul. 25, 2013 (TW) .................................. 102126612

(51) Int. Cl.
*G06F 3/033* (2013.01)
*G06F 3/045* (2006.01)
*G06F 3/0354* (2013.01)
*G06F 3/044* (2006.01)

(52) U.S. Cl.
CPC ............ *G06F 3/045* (2013.01); *G06F 3/03545* (2013.01); *G06F 3/044* (2013.01)
USPC .......................................... 345/179; 345/156

(58) Field of Classification Search
USPC ............. 345/156, 179–184; 178/19.01–19.07
See application file for complete search history.

(56) References Cited

U.S. PATENT DOCUMENTS

| | | | |
|---|---|---|---|
| 2004/0095120 A1* | 5/2004 | Kernahan ..................... | 323/282 |
| 2004/0095121 A1* | 5/2004 | Kernahan et al. ............. | 323/283 |
| 2008/0012835 A1* | 1/2008 | Rimon et al. .................. | 345/173 |
| 2008/0218494 A1* | 9/2008 | Perski et al. .................. | 345/174 |
| 2012/0169635 A1* | 7/2012 | Liu ................................ | 345/173 |
| 2013/0076374 A1* | 3/2013 | Huang ........................... | 324/618 |
| 2014/0009445 A1* | 1/2014 | Kim et al. ..................... | 345/179 |

* cited by examiner

*Primary Examiner* — Ricardo L Osorio (74) *Attorney, Agent, or Firm* — WPAT, PC; Justin King (57) ABSTRACT

A method for compensating electromagnetic inductive pressure level of an electromagnetic pen is disclosed. First of all, an electromagnetic pen is provided on a touch panel, wherein the touch panel has a sensor layer and at least one sensor coil on a transparent substrate, the sensor coil is located on the peripheral region of the transparent substrate and around the sensor layer. Then a signal amplitude of the electromagnetic pen is calculated and a pressure level value is calculated via a frequency of the electromagnetic pen. Next distances between the sensor coil and the electromagnetic pen are calculated to obtain the location of the electromagnetic pen. Then a pressure level compensation value is obtained from a pressure level compensation value table. Finally, a compensated pressure level value is obtained by adding the pressure level value and the pressure level compensation value.

4 Claims, 7 Drawing Sheets

```
          providing an electromagnetic
             pen on a touch panel
                      76
```
↓
```
     calculating a signal amplitude of the
    electromagnetic pen and calculating a pressure
     level value of the electromagnetic pen according
           to a frequency of the electromagnetic pen
                           77
```
↓
```
    calculating a distance between a sensor coil and the
      electromagnetic pen via the signal amplitude and
    obtaining a pressure level compensation parameter value
        through a pressure level compensation table
                            78
```
↓
```
  obtaining a compensated pressure level by adding
    the pressure level of the electromagnetic pen and
       the pressure level compensation value
                        79
```

FIG.7C

METHOD FOR COMPENSATING ELECTROMAGNETIC INDUCTIVE PRESSURE LEVEL

BACKGROUND OF THE INVENTION

1. Field of the Invention

The present invention generally relates to a method for compensating electromagnetic inductive pressure level of an electromagnetic pen, and more particularly to a method for compensating electromagnetic inductive pressure level of an electromagnetic pen with a pressure level compensation value table.

2. Description of the Related Art

Electromagnetic-type input technology applies electromagnetic pens and the input device with induction sensor coils. Electromagnetic pen has advantages of convenient for writing, tip pressure level function, and certain sensing height, and further has side button (as right button or middle button) function as well as electromagnetic pen tail eraser function to increase the functionality and flexibility of use.

Capacitive touch input technology is the mainstream of the input technologies applied to the widely used touch panel. Touch panel module of a touch panel contains a sensor layer which can store charges. Sensors located around the touch panel apply an electric field on the surface of the touch panel and form a capacitor. For a passive touch source, such as a user's finger or a conductive device, when the touch source contacts the surface of the touch panel, electric currents are generated between the touch source and the sensors of the touch panel. Coordinates of touch points on the touch panel can be calculated through different electric currents generated between different sensors and the touch source. Since a passive type touch panel must be used with a conductor, a normal passive type touch panel will not work well when it is used with an non-conductive touch source such as a user with a glove or an non-conductive stylus. In contrary to the passive type touch panel, an active type capacitive touch input technology, sensors generate signal currents to calculate coordinates of touch points on a touch panel when the sensors detect contacts from a touch source, usually a conductive touch source.

Although electromagnetic type input technology has advantages of convenient for writing, tip pressure level function, and certain sensing height as mentioned above, an user's finger(s) or other touch sources will not work and a particular stylus must be used for input operation. Capacitive touch input technology has advantages of allowing the use of variety of touch sources such as an user's finger(s) for input operation and multi-touch gestures for various operations and functions. Thus integrating both electromagnetic and capacitive input technologies into a touch panel will have both advantages thereof and significantly increase convenience of use.

However, the trend of development of touch panel is toward light weight, thin thickness and low production cost. Conventional arrangement of placing an electromagnetic induction substrate beneath a touch panel has the advantage of not affecting optical characteristics of the touch panel but also has disadvantages of increase weight and cost and alignment problem between a display panel and an electromagnetic induction substrate during manufacture processes.

In order to save costs, new technologies directly omit the substrate for supporting electromagnetic induction sensor coils and form electromagnetic induction sensor coils on a peripheral area of a sensor layer of a touch panel. However since sensor coils are only located on the peripheral area of the touch panel, signal strengths of a stylus or an electromagnetic pen on different locations inside the sensor coils would vary which also cause error on pressure level values of the stylus or electromagnetic pen. Therefore, it is necessary to provide a solution to solve the problem of the pressure level value error resulting from the stylus or electromagnetic pen on different locations inside the sensor coils.

SUMMARY OF THE INVENTION

One object of the invention is to provide a method for compensating electromagnetic inductive pressure level of an electromagnetic pen. By utilizing a pressure level compensation table corresponding to coordinates of an electromagnetic pen, when the electromagnetic pen is applied on a touch panel and a tip pressure level function is used, a pressure level value close to the true pressure level value can be obtained through automatic compensation via a pressure level compensation table and coordinates of the electromagnetic pen so as to prevent the problem of tip pressure level value error resulting from non-uniform signal strength due to different distances between the coordinates of the electromagnetic pen and the sensor coil located on the peripheral area of the touch panel.

The invention provides a method for establishing a pressure level compensation table. First of all, an electromagnetic pen with a standard or predetermined frequency and a standard or predetermined signal amplitude is applied on a touch panel. Then signal amplitudes of the electromagnetic pen on predetermined locations on the touch panel are measured. Next distances between a sensor coil and the electromagnetic pen are calculated by calculating the differences between the measured signal amplitudes and the standard signal amplitude. Then frequencies of the electromagnetic pen on the predetermined locations are measured. Finally, frequency error values of the predetermined locations can be obtained by calculating the differences between the measured frequencies of the electromagnetic pen on the predetermined locations and the standard frequency to establish a pressure level compensation table. The touch panel has a sensor layer and at least one sensor coil on a transparent substrate, the sensor coil is located on the peripheral region of the transparent substrate and around the sensor layer.

The invention provides a method for compensating electromagnetic inductive pressure levels of an electromagnetic pen. First of all, an electromagnetic pen is applied on a touch panel. Then a signal amplitude of the electromagnetic pen is calculated and a pressure level value is calculated according to a frequency of the electromagnetic pen. Next a distance between the electromagnetic pen and the sensor coil is calculated according to the signal amplitude to locate the electromagnetic pen. Then a pressure level compensation value is obtained from the pressure level compensation value table. Finally, a compensated pressure level value is obtained by adding the pressure level value and the pressure level compensation value. The touch panel has a sensor layer and at least one sensor coil on a transparent substrate, the sensor coil is located on the peripheral region of the transparent substrate and around the sensor layer.

DETAILED DESCRIPTION

Embodiment of this invention will be described in detail below. However, in addition to as described below, and this invention can be broadly implemented in the other cases the purpose and scope of this invention is not affected by the application of qualified, claim after its prevail. Furthermore, to provide a description more clear and easier to understand the invention, the pieces within the schema and not in accordance with their relative size of drawing, compared to certain dimensions to other scales have been exaggerated; details not related nor completely drawn in part in order to schematic simplicity.

Figure 1:
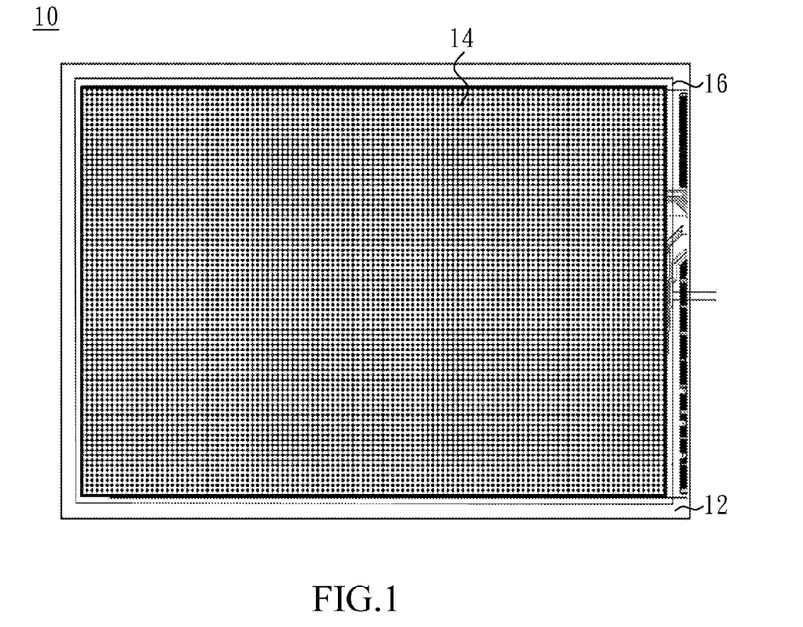
FIG. 1 shows a sensor substrate of a touch panel.

FIG. 1 shows a sensor substrate of a touch panel. Sensor substrate 10 has a sensor layer 14 and at least one electromagnetic sensor coil 16 on a transparent substrate 12. The sensor substrate 10 is generally located above the liquid crystal display panel of a touch panel. The transparent substrate 12 comprises, but not limited to, a glass substrate. The sensor layer 14 comprises a plurality of capacitive detection electrodes and conductive lines connecting the detection electrodes to a touch control circuit. The detection electrodes arrange to form a touch sensing area. In one embodiment, capacitors are formed between a touch source such as a user's finger(s) and the detection electrodes when the touch source approaches the detection electrodes or contacts the cover glass substrate above the detection electrodes. The location of the touch source such as the user's finger(s) on the touch sensing area is the location of the detection electrode being approached or contacted, and the capacitance of the detection electrode changes due to the capacitance between the touch source such as the user's finger(s) and the detection electrode.

The electromagnetic sensor coil 16 comprises a plurality of metal sensor coils located on a peripheral area of the sensor layer 14 of the transparent substrate 12 and connecting to an electromagnetic sensing control circuit. The electromagnetic sensor coil 16 receives signals from an electromagnetic pen and detects various functions such as variation of pressure level value of the electromagnetic pen tip, side button being pressed or not, and tail eraser being used or not via the variation of the frequency of the electromagnetic pen.

Figure 2:
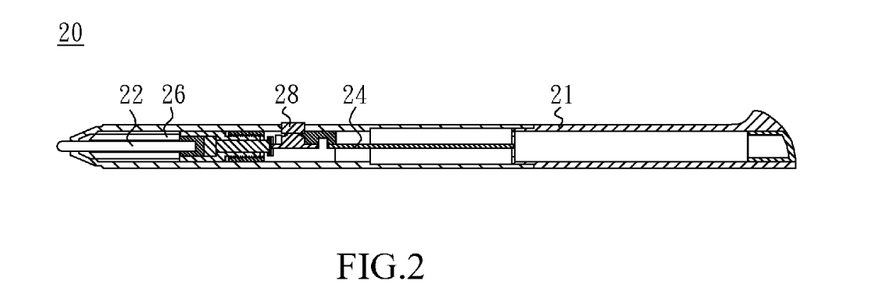
FIG. 2 shows an electromagnetic pen which could be used with the sensor substrate shown in FIG. 1.

FIG. 2 shows an electromagnetic pen which could be used with the sensor substrate shown in FIG. 1. The electromagnetic pen 20 comprises a pen tube 21, a pin 22, a circuit board 24, a ferrite core 26 and a button 28. In order to being suitable for being used on the sensor substrate shown in FIG. 1, the pin 22 comprises a conductive pin such as a metal pin. The pin 22 generally is movable to simulate and reply variation of pressure level value of the tip of the electromagnetic pen 20. More particularly, a typical design is to change frequency of the electromagnetic pen 20 as well as the variation of pressure level value of the tip of the electromagnetic pen 20 via the movement of the pin 22. The variation of the frequency of the electromagnetic pen 20 can be achieved through the variation of inductance of resonance circuit of the electromagnetic pen 20. For example, the variation of inductance of resonance circuit of the electromagnetic pen 20 is achieved through relative displacement between the pin 22 and the ferrite core 26, or relative displacement between the ferrite core 26 and other ferrite core. The ferrite core 26 connects the circuit board 24 through conductive lines. The circuit board 24 has a resonance circuit and a control circuit of the electromagnetic pen 20. The button 28 is used to change the frequency of the electromagnetic pen 20 through switch on the circuit board 24 so as to perform predetermined functions of the electromagnetic pen 20.

Figure 3A:
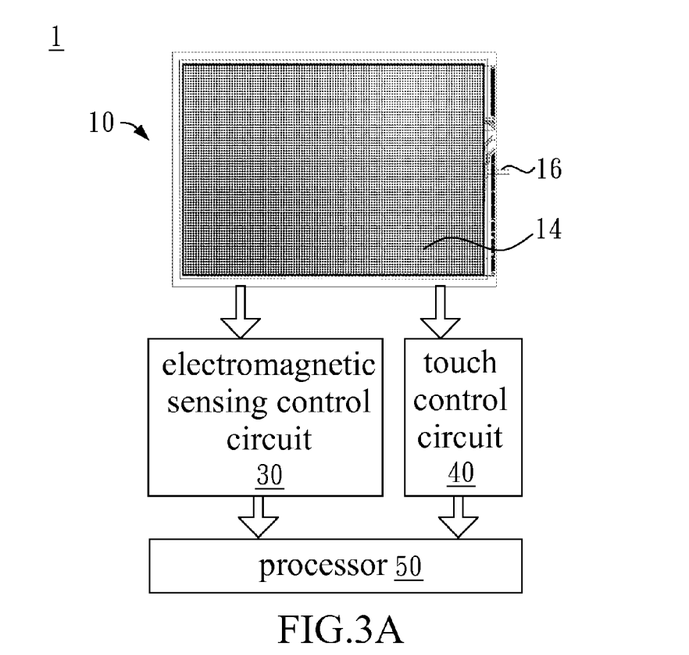
FIG. 3A shows a block diagram of a touch control and sensing module of a touch panel.

FIG. 3A shows a block diagram of a touch control and sensing module of a touch panel. Touch control and sensing module 1 comprises the sensor substrate 10, an electromagnetic sensing control circuit 30, a touch control circuit 40 and a processor 50. The electromagnetic sensing control circuit 30 is used to process signals received by the electromagnetic sensor coil 16 from an electromagnetic pen to calculate variation of frequency of the electromagnetic pen for performing predetermined functions such as variation of pressure level value of the electromagnetic pen tip, side button being pressed. The touch control circuit 40 is used to process touch control signals from the sensor layer 14 to detect coordinates of the electromagnetic pen 20. The electromagnetic sensing control circuit 30 comprises dual channel multiplexers, an amplifier and filter circuit, a sampling circuit and a micro controller. The touch control circuit 40 comprises multi-channel multiplexers, an amplifier and filter circuit, a sampling circuit and a micro controller. The processor 50 integrates and processes signals from the electromagnetic sensing control circuit 30 and the touch control circuit 40 including variation of frequency of the electromagnetic pen for performing functions of variation of pressure level value of the electromagnetic pen tip, side button being pressed and coordinates of the electromagnetic pen.

Figure 3B:
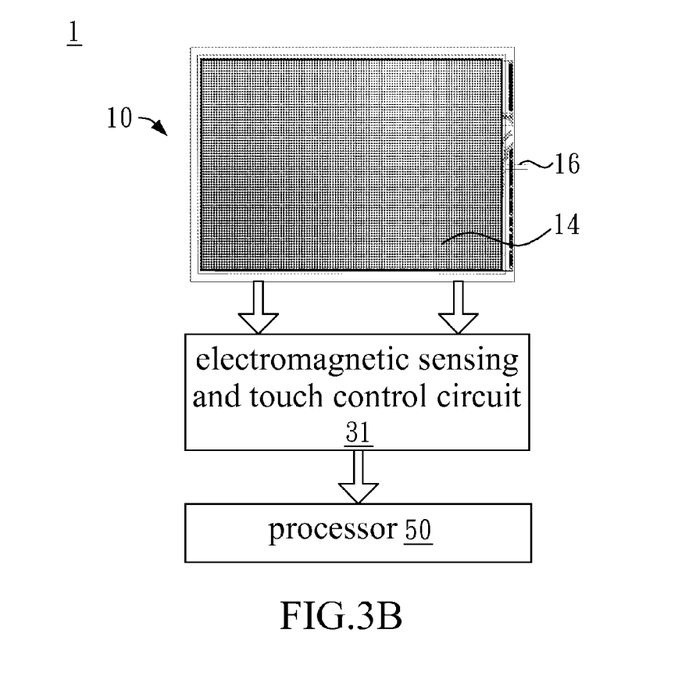
FIG. 3B shows another block diagram of another touch control and sensing module of a touch panel.

It is noted that the electromagnetic sensing control circuit 30 and the touch control circuit 40 are not necessarily separated devices. The electromagnetic sensing control circuit 30 and the touch control circuit 40 can be two portions for performing different functions being integrated into a single device. FIG. 3B shows another block diagram of another touch control and sensing module of a touch panel.

Touch control and sensing module 1 comprises the sensor substrate 10, an electromagnetic sensing and touch control circuit 31, a touch control circuit 40 and a processor 50. The electromagnetic sensing and touch control circuit 31 is used to process signals received by the electromagnetic sensor coil 16 from an electromagnetic pen and signals from the sensor layer 14 to calculate variation of frequency of the electromagnetic pen and generate coordinates of the electromagnetic pen for performing predetermined functions such as variation of pressure level value of the electromagnetic pen tip, side button being pressed. The electromagnetic sensing and touch control circuit 31 comprises dual and multi-channel channel multiplexers, an amplifier and filter circuit, a sampling circuit and a micro controller. The processor 50 processes signals from the electromagnetic sensing and touch control circuit 31 including variation of frequency of the electromagnetic pen for performing functions of variation of pressure level value of the electromagnetic pen tip, side button being pressed and coordinates of the electromagnetic pen.

Figure 4:
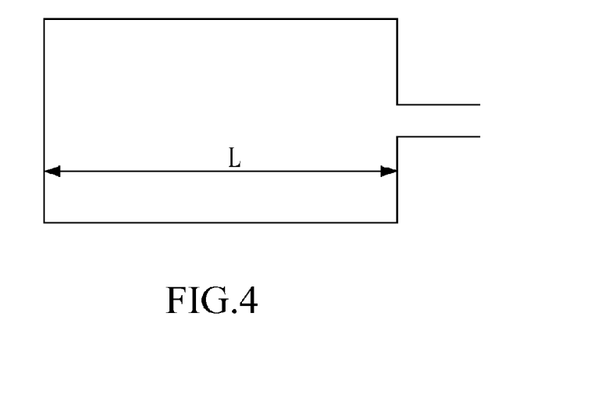
FIG. 4 shows a sensor coil.
Figure 5A:
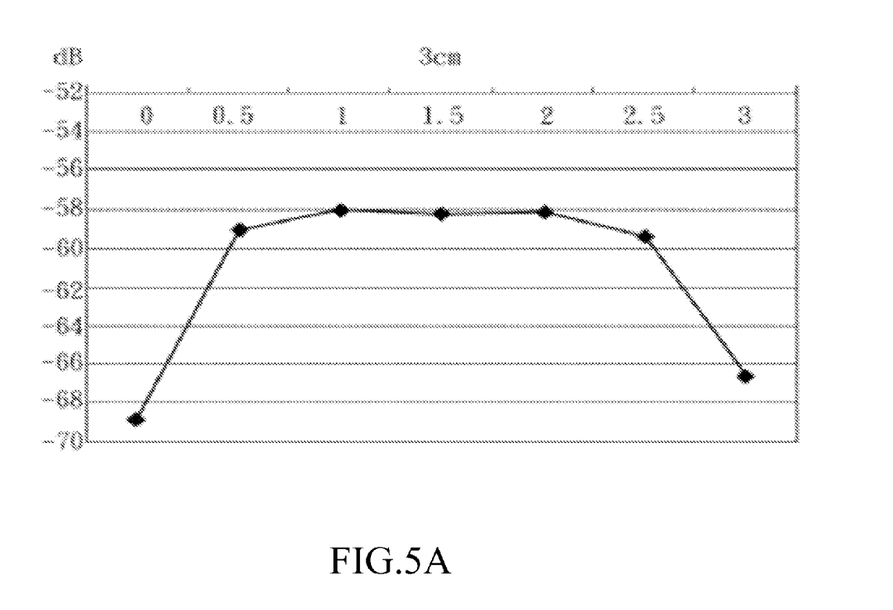
FIG. 5A to FIG. 5C show the relation between locations of the electromagnetic pen inside the sensor coil and signal strength received by the sensor coil.
Figure 5B:
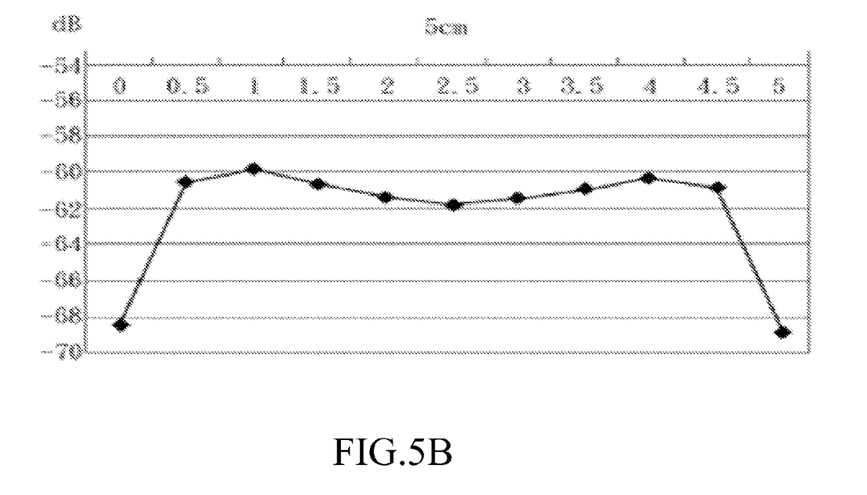
Figure 5C:
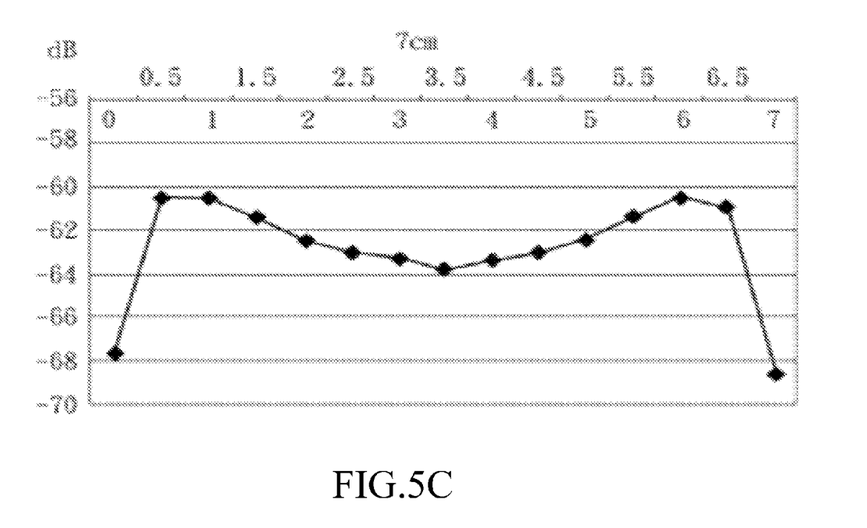

As mentioned above, the variation of pressure level value of the tip of the electromagnetic pen is generated through the variation of frequency of the electromagnetic pen. Since the sensor coil is located on the peripheral area of the sensor layer of the touch panel, the signals from the electromagnetic pen are all received by the sensor coil no matter where the electromagnetic pen is located inside the sensor coil. However, since different locations have different distances with the sensor coil, problems of non-uniform signal strength and tip pressure level value error will present. These problems will be even worse as the sizes of the touch panel or the sensor coil increase. FIG. 4 shows a sensor coil, while FIG. 5A to FIG. 5C show the relation between locations of the electromagnetic pen inside the sensor coil and signal strength received by the sensor coil. As shown in FIG. 4 and FIG. 5A to FIG. 5C, the problem of non-uniform signal strength is more obvious as the size L of the sensor coil increases. That is, the signal strength received by the sensor coil is weaker as the distance between the sensor coil and the electromagnetic pen increases.

Figure 6:
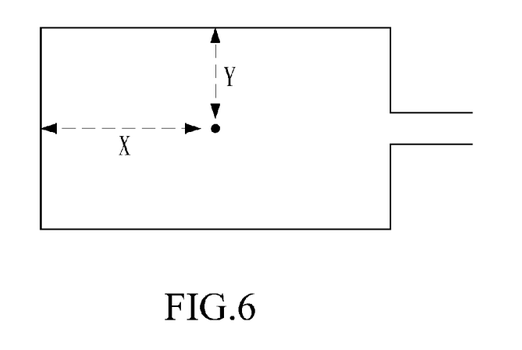
FIG. 6 shows a predetermined location inside a sensor coil on a touch panel.

In one embodiment of the invention, compensation of pressure level value of an electromagnetic pen is achieved according to the signal amplitudes of the electromagnetic pen and a pressure level compensation table. First of all, an electromagnetic pen with a standard or predetermined frequency and a standard signal amplitude is applied on a touch panel, and predetermined locations are calculated through distances between the electromagnetic pen and a sensor coil on the touch panel. Frequencies of the electromagnetic pen on the predetermined locations are also obtained. FIG. 6 shows a predetermined location inside a sensor coil on a touch panel. Since signal amplitudes of the electromagnetic pen received by the sensor coil decrease as distances between the electromagnetic pen and the sensor coil increase, the distances between the electromagnetic pen and the sensor coil such as distances X and Y between the location and the vertical portion and the horizontal portion respectively can be calculated by degradation of the signal amplitudes of the electromagnetic pen. Finally, frequency error values of the predetermined locations can be obtained by calculating the differences between the measured frequencies of the electromagnetic pen on the predetermined locations and the standard frequency to establish a pressure level compensation table.

Figure 7A:
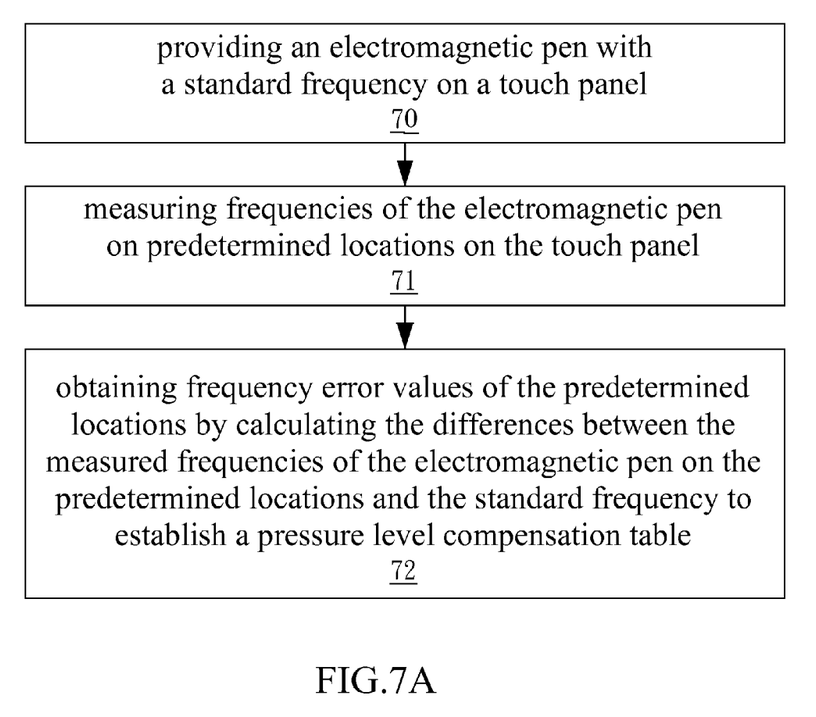
FIG. 7A shows a flow chart of a method for establishing a pressure level compensation table according to one embodiment of the invention.

FIG. 7A shows a flow chart of a method for establishing a pressure level compensation table according to one embodiment of the invention. As shown in FIG. 7A, first of all, an electromagnetic pen with a standard or predetermined frequency is applied on a touch panel in step 70. Then in step 71, frequencies of the electromagnetic pen on predetermined locations on the touch panel are measured. Finally, frequency error values of the predetermined locations can be obtained by calculating the differences between the measured frequencies of the electromagnetic pen on the predetermined locations and the standard frequency to establish a pressure level compensation table in step 72. The pressure level compensation table can be built in firmwares of a processor or an electromagnetic sensing control circuit or an electromagnetic sensing and touch control circuit of the touch panel.

Figure 7B:
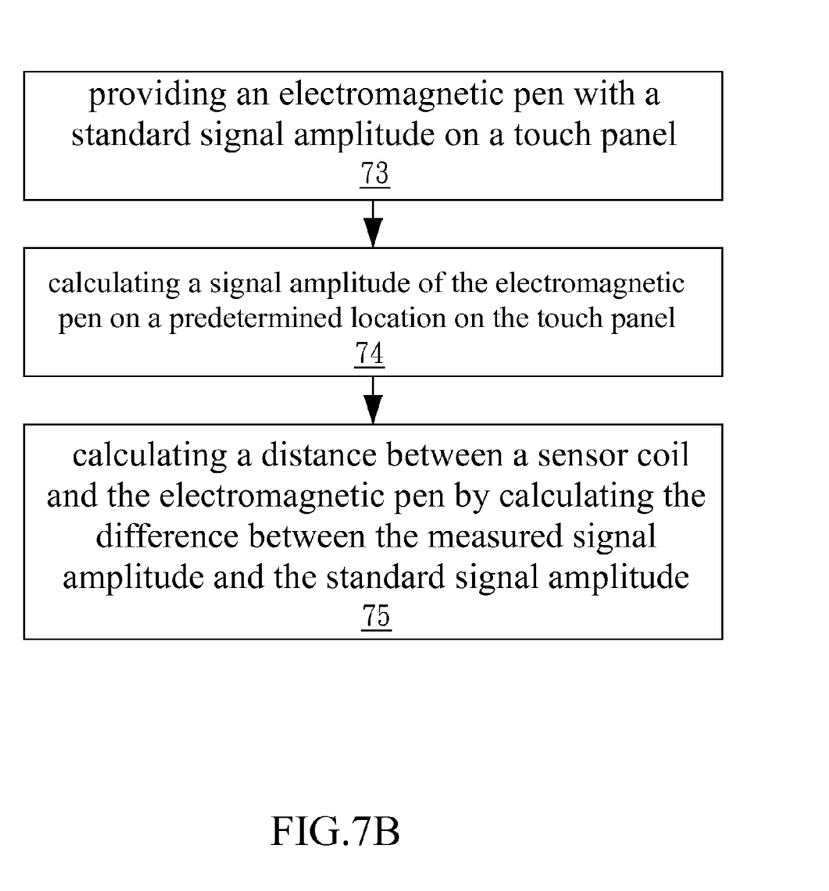
FIG. 7B shows a flow chart of a method for calculating distances between an electromagnetic pen and a sensor coil on a touch panel according to one embodiment of the invention.

As mentioned above, predetermined locations on the touch panel are determined via distances between an electromagnetic pen and a sensor coil on the touch panel. Since signal amplitudes of the electromagnetic pen received by the sensor coil decrease as distances between the electromagnetic pen and the sensor coil increase, the distances between the electromagnetic pen and the sensor coil can be calculated by degradation of the signal amplitudes of the electromagnetic pen. FIG. 7B shows a flow chart of a method for calculating a distance between an electromagnetic pen and a sensor coil on a touch panel according to one embodiment of the invention. As shown in FIG. 7B, an electromagnetic pen with a standard or predetermined signal amplitude is applied on a touch panel in step 73. Then a signal amplitude of the electromagnetic pen on a predetermined location on the touch panel is measured in step 74. Next a distance between a sensor coil and the electromagnetic pen is calculated by calculating the difference between the measured signal amplitude and the standard signal amplitude in step 75.

Figure 7C:
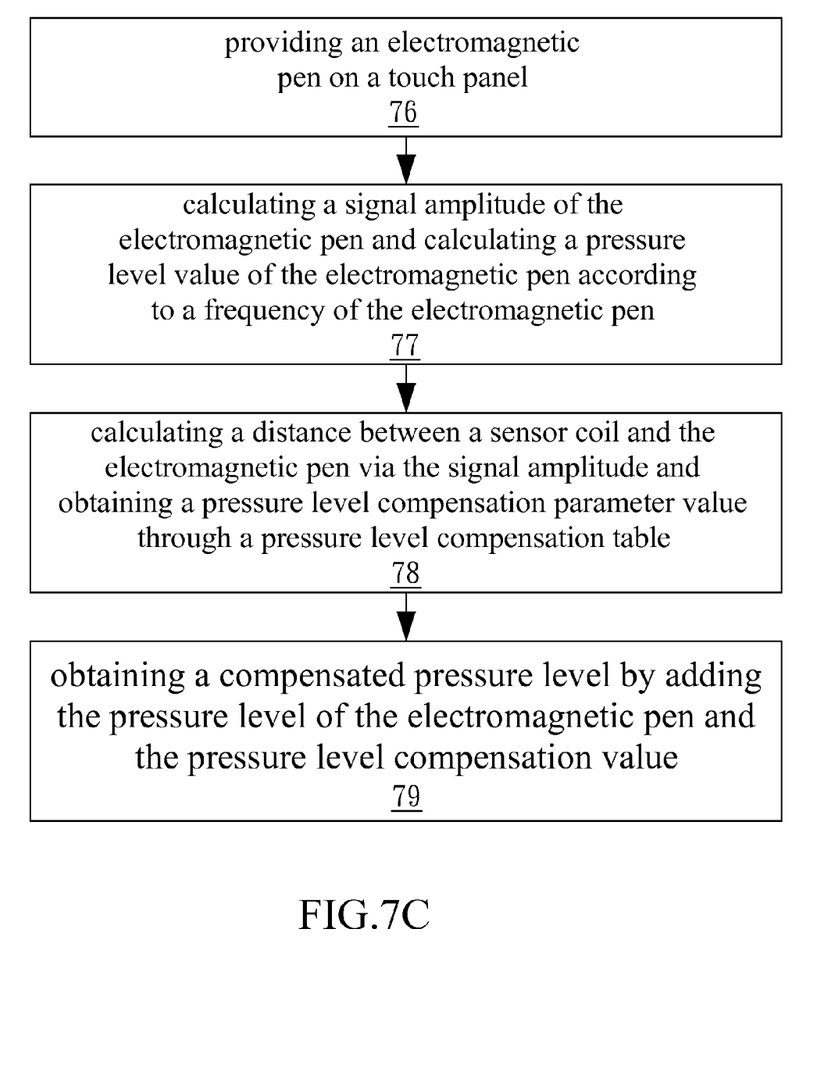
FIG. 7C shows a flow chart of a method for compensating electromagnetic inductive pressure levels of an electromagnetic pen according to one embodiment of the invention.

When an electromagnetic pen is applied on the touch panel, the pressure level compensation table can be used to perform a method for compensating electromagnetic inductive pressure levels of the electromagnetic pen. FIG. 7C shows a flow chart of a method for compensating electromagnetic inductive pressure levels of an electromagnetic pen according to one embodiment of the invention. As shown in FIG. 7C, first of all, an electromagnetic pen is applied on a touch panel in step 76. Then in step 77, a signal amplitude of the electromagnetic pen is obtained and a pressure level of the electromagnetic pen is calculated according to a frequency of the electromagnetic pen. Next in step 78, a distance between a sensor coil and the electromagnetic pen is calculated via the signal amplitude and a pressure level compensation parameter value is obtained through a pressure level compensation table. Finally in step 79, a compensated pressure level is obtained by adding the pressure level of the electromagnetic pen and the pressure level compensation value.

The invention utilizes a pressure level compensation table corresponding to coordinates of an electromagnetic pen to compensate pressure levels of the electromagnetic pen. When the electromagnetic pen is applied on a touch panel and a tip pressure level function is used, distances between the electromagnetic pen and a sensor coil are calculated via signal amplitudes so as to locate coordinates of the electromagnetic pen. A pressure level value close to the true pressure level value can be obtained through automatic compensation via a pressure level compensation table and coordinates of the electromagnetic pen so as to prevent the problem of tip pressure level value error resulting from non-uniform signal strength due to different distances between the coordinates of the electromagnetic pen and the sensor coil located on the peripheral area of the touch panel.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for establishing a pressure level compensation value table for an electromagnetic pen, comprising:
    providing an electromagnetic pen with a standard or predetermined frequency and a standard or predetermined signal amplitude on a touch panel, wherein the touch panel has a sensor layer and at least one sensor coil on a transparent substrate, the sensor coil is located on the peripheral region of the transparent substrate and around the sensor layer;
    measuring signal amplitudes of the electromagnetic pen on predetermined locations on the touch panel;

calculating distances between the electromagnetic pen and the sensor coil by calculating the differences between the measured signal amplitudes and the predetermined signal amplitude;

measuring frequencies of the electromagnetic pen on the predetermined locations on the touch panel; and establishing a pressure level compensation table via obtaining frequency error values of the predetermined locations by calculating the differences between the measured frequencies of the electromagnetic pen on the predetermined locations and the standard frequency.

2. A method for compensating electromagnetic inductive pressure level of an electromagnetic pen, comprising:

providing an electromagnetic pen on a touch panel, wherein the touch panel has a sensor layer and at least one sensor coil on a transparent substrate, the sensor coil is located on the peripheral region of the transparent substrate and around the sensor layer;

calculating a signal amplitude of the electromagnetic pen and calculating a pressure level value according to a frequency of the electromagnetic pen;

calculating a distance between the electromagnetic pen and the sensor coil according to the signal amplitude to locate the electromagnetic pen;

obtaining a pressure level compensation value from the pressure level compensation value table of claim 1; and obtaining a compensated pressure level value by adding the pressure level value and the pressure level compensation value.

3. The method of claim 1, wherein the sensor layer comprises a plurality of capacitive detection electrodes.

4. The method of claim 3, wherein the electromagnetic pen comprises a conductive pin.

\* \* \* \* \*